US012639256B2

(12) United States Patent
Noguera Serra et al.

(10) Patent No.: US 12,639,256 B2
(45) Date of Patent: May 26, 2026

(54) CONTROLLERS IN DATA PROCESSING ENGINE COLUMNS

(71) Applicant: XILINX, INC., San Jose, CA (US)

(72) Inventors: Juan J. Noguera Serra, San Jose, CA (US); David Patrick Clarke, Dublin (IE); Javier Cabezas Rodriguez, Austin, TX (US); Mikhail Asiatici, Cambridge (GB); Patrick Schlangen, Cologne (DE)

(73) Assignee: XILINX, INC., San Jose, CA (US)

( * ) Notice: Subject to any disclaimer, the term of this patent is extended or adjusted under 35 U.S.C. 154(b) by 10 days.

(21) Appl. No.: 18/781,952

(22) Filed: Jul. 23, 2024

(65) Prior Publication Data

US 2026/0030198 A1    Jan. 29, 2026

(51) Int. Cl.
*G06F 15/80*      (2006.01)
*G06F 13/28*      (2006.01)
*G06N 20/00*      (2019.01)

(52) U.S. Cl.
CPC .............. *G06F 15/80* (2013.01); *G06F 13/28* (2013.01); *G06N 20/00* (2019.01)

(58) Field of Classification Search
CPC .......... G06F 15/80; G06F 13/28; G06N 20/00
See application file for complete search history.

(56) References Cited

U.S. PATENT DOCUMENTS

| | | | |
|---|---|---|---|
| 9,218,443 B1* | 12/2015 | Styles | G06F 8/451 |
| 9,846,660 B2 | 12/2017 | Styles et al. | |
| 10,031,760 B1 | 7/2018 | Santan et al. | |
| 10,790,828 B1* | 9/2020 | Gunter | H03K 19/017509 |
| 10,802,995 B2 | 10/2020 | Singh et al. | |
| 10,877,766 B2 | 12/2020 | Soe et al. | |
| 10,924,430 B2 | 2/2021 | Thyamagondlu et al. | |
| 11,694,066 B2 | 7/2023 | Ng et al. | |
| 12,067,465 B2* | 8/2024 | Kalari | G06F 9/38 |
| 2019/0303311 A1* | 10/2019 | Bilski | G06F 13/1657 |

OTHER PUBLICATIONS

U.S. Appl. No. 18/781,955, filed Jul. 23, 2024 Entitled "Executing Workloads Across Data Processing Engine Columns".

* cited by examiner

*Primary Examiner* — Corey S Faherty
(74) *Attorney, Agent, or Firm* — Patterson + Sheridan, LLP

(57)    ABSTRACT

Embodiments herein describe a hardware accelerator with an array of data processing engines (DPEs) which includes a controller (e.g., a microcontroller) for multiple columns of the array. The controllers can be hardened circuitry that executes software code (or firmware) that controls the hardware accelerator. In one embodiment, the task of the controller is to control and orchestrate the functions performed by the hardware accelerator.

19 Claims, 11 Drawing Sheets

500

FETCH COMMANDS FROM A BINARY GENERATED BY A COMPILER
505

LOAD COMMANDS INTO THE DM
510

CONVERT THE COMMANDS INTO DMA AND CONTROL
INSTRUCTIONS
515

TRANSMIT THE DMA CONTROL INSTRUCTIONS TO DMAs IN
MEMORY AND INTERFACE TILES
520

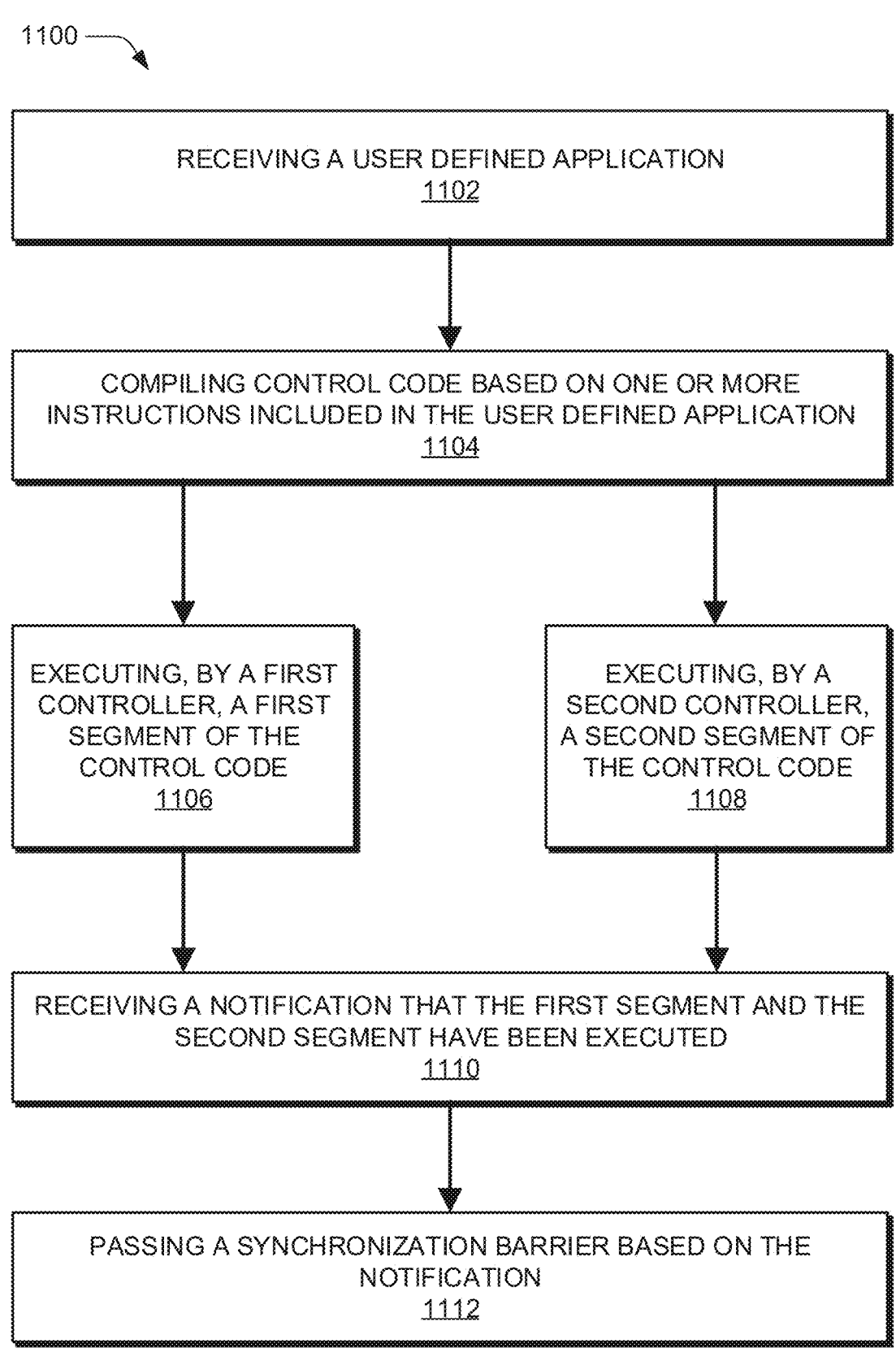

1100

RECEIVING A USER DEFINED APPLICATION
1102

COMPILING CONTROL CODE BASED ON ONE OR MORE
INSTRUCTIONS INCLUDED IN THE USER DEFINED APPLICATION
1104

EXECUTING, BY A FIRST
CONTROLLER, A FIRST
SEGMENT OF THE
CONTROL CODE
1106

EXECUTING, BY A
SECOND CONTROLLER,
A SECOND SEGMENT OF
THE CONTROL CODE
1108

RECEIVING A NOTIFICATION THAT THE FIRST SEGMENT AND THE
SECOND SEGMENT HAVE BEEN EXECUTED
1110

PASSING A SYNCHRONIZATION BARRIER BASED ON THE
NOTIFICATION
1112

FIG. 11

CONTROLLERS IN DATA PROCESSING ENGINE COLUMNS

TECHNICAL FIELD

Examples of the present disclosure generally relate to executing workloads using parallel hardware, and more specifically, to executing workloads across artificial intelligence engine (AIE) columns.

BACKGROUND

Implementing parallel hardware architectures for executing workloads can improve execution efficiency relative to serial hardware architectures because the parallel architectures are capable of executing workload components simultaneously. However, a typical workload often includes at least some workload components which need to be executed in a particular order such as when an output from execution of a first workload component is an input needed to execute a second workload component. Synchronizing execution of workload components that need to be executed in a certain order is a challenge to implementing parallel hardware architectures.

SUMMARY

One embodiment herein is a hardware accelerator array that includes a plurality of data processing engine (DPE) tiles arranged in a plurality of columns and a plurality of interface tiles where each of the plurality of columns includes at least one of the plurality of interface tiles and each of the plurality of interface tiles comprises a respective controller configured to control execution of multiple DPE tiles in a respective column of the plurality of columns.

Another embodiment herein is a hardware accelerator array that includes a plurality of data processing engine (DPE) tiles arranged in a plurality of columns and a plurality of controllers arranged in the plurality of columns where the plurality of controllers configured to control execution of only DPE tiles in a same column.

Another embodiment herein is a method for controlling a plurality of data processing engine (DPE) tiles arranged in a plurality of columns in a hardware accelerator array. The method includes fetching, using a plurality of controllers, commands from a binary where the plurality of controllers are disposed within the plurality of columns; converting, using the plurality of controllers, the commands into DMA and control instructions; and transmitting the DMA and control instructions from the plurality of controllers to DMA circuitry in the hardware accelerator array to move data into the plurality of DPE tiles for processing.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 11 is a flow diagram depicting a method for executing workloads across an array of controllers, according to an example.

DETAILED DESCRIPTION

Figure 1:
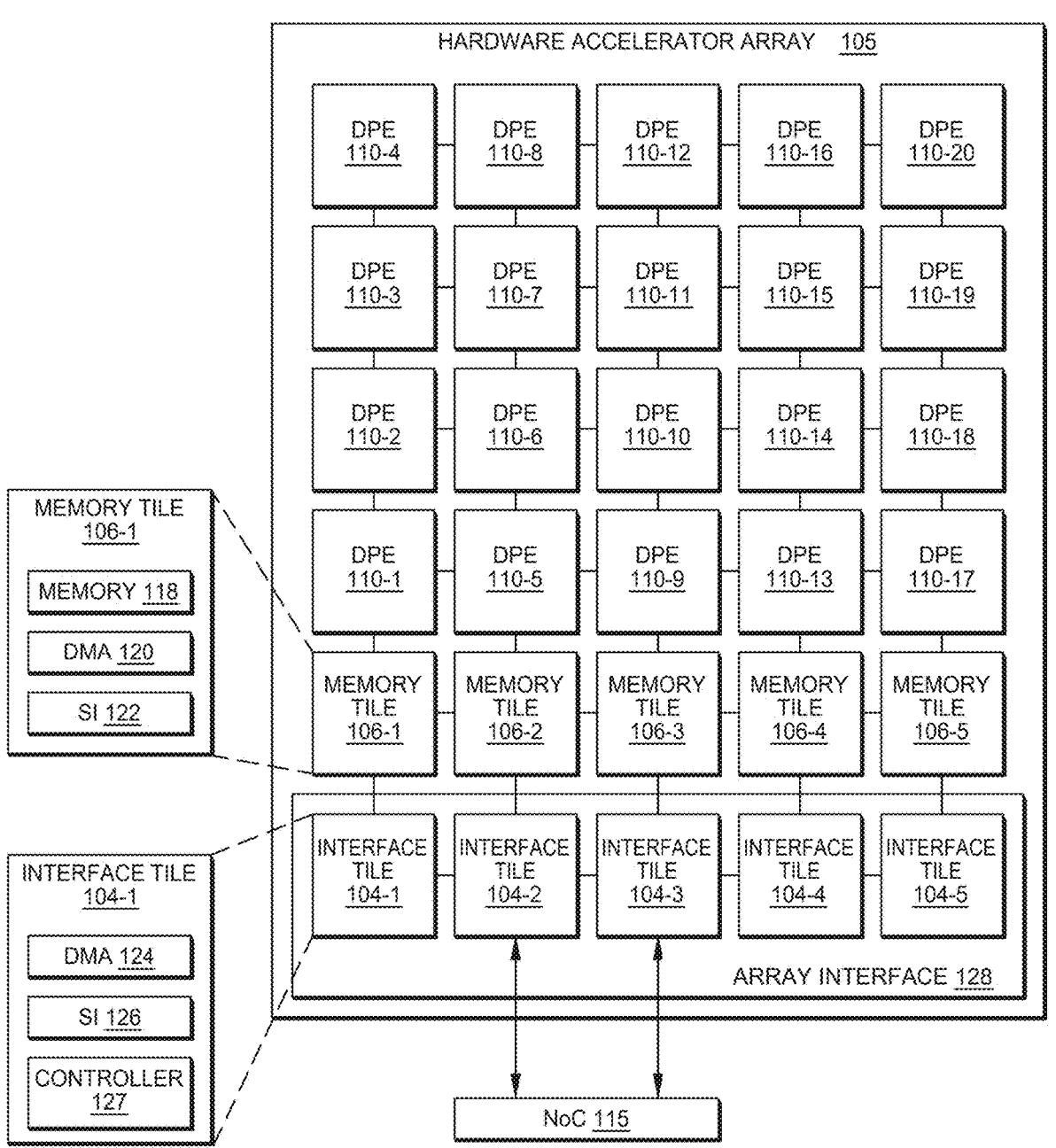
FIG. 1 is a block diagram of a hardware accelerator array, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a hardware accelerator with an array of data processing engines (DPEs) which includes a controller (e.g., a microcontroller) for each column of the array. The controllers can be hardened circuitry that executes software code (or firmware) that controls the hardware accelerator. In one embodiment, the task of the controller is to control and orchestrate the functions performed by the hardware accelerator. However, in other embodiments, other tasks may be performed by the controller, such as moving data into and out of the accelerator. The controller may execute different specialized code depending on the task a central processing unit (CPU) has currently assigned to it.

Advantages of using multiple controllers (e.g., a controller for each column of the array of DPEs) is the design scales as the size of the array increases. In contrast, in designs where a single controller is used to control and orchestrate the functions performed by the hardware accelerator, the controller can become a bottleneck. In one embodiment, the controllers are integrated into interface tiles (or shim tiles) in the array.

Executing an application across an array of parallel controllers is challenging because some instructions included in the application may need to be executed before other instructions included in the application. Additionally, certain instructions included in the application may be delayed in execution by operations such as memory accesses which increases synchronization challenges. Examples herein describe executing workloads across DPE columns where each of the DPE columns includes a controller.

A workload is received as a user defined application to be executed across the controllers. In one or more embodiments, a virtual instruction set architecture (ISA) defines types of instructions executable by the controllers, and control code is compiled based on the virtual ISA and one or more instructions included in the user defined application. For example, the control code is organized into control code segments which each include jobs. The jobs are sets of sequential operations which may correspond to the one or more instructions included in the user defined application.

In order to execute the segments of the control code, a lead controller is designated (e.g., as the first controller of the controllers or by any other designation method). At least one worker controller is also designated (e.g., as the second controller of the controllers or by any other designation method). In some embodiments, the lead controller and the worker controller each execute firmware including a register-based interpreter having a built-in scheduler and a base operating system (OS).

In various examples, a processor of the lead controller executes the firmware which causes the lead controller to assign a first segment of the control code for execution by the lead controller and a second segment of the control code to the worker controller for execution. The register-based interpreter of the worker controller cycles through jobs included in the second segment of the control code and selects a runnable job to execute. For example, when the currently running job yields or performs an operation such as a data memory access (DMA), then the job is preempted, and the built-in scheduler of the register-based interpreter moves to a next runnable job included in the second segment of the control code. A state of the preempted job is maintained in one or more registers of a dedicated register-file available to the register-based interpreter. In some examples, when the next runnable job is complete and/or when the preempted job is again runnable, then the preempted job can be completed using the state maintained in the dedicated register-file.

In certain embodiments, when all of the jobs included in the first segment of the control code have been executed, the lead controller reaches a first synchronization barrier. The first synchronization barrier is one or more lines of code included within the first segment of the control code. The first synchronization barrier prevents the lead controller from passing the first synchronization barrier before all of the jobs included in the second segment of the control code have been executed. After all of the jobs included in the second segment of the control code have been executed, the lead controller can pass the first synchronization barrier and perform additional jobs or become available for allocation. As described below, the first synchronization barrier allows the lead controller and the worker controller to maintain synchronization using local DM reads and one remote DM write which is more efficient than performing multiple remote DM reads for synchronization.

Upon reaching the first synchronization barrier, the lead controller reads from a shared data memory (DM) of the lead controller to determine if all of the jobs included in the second segment of the control code have been executed. In some embodiments, when all of the jobs included in the second segment of the control code have been executed, the worker controller writes an indication that the second segment of the control code has been executed to the shared DM of the lead controller. After writing the indication to the shared DM of the lead controller, the worker controller reaches a second synchronization barrier. The second synchronization barrier is one or more lines of code included within the second segment of the control code. The second synchronization barrier prevents the worker controller from passing the second synchronization barrier before all of the jobs included in the first segment of the control code have been executed. After all of the jobs included in the first segment of the control code have been executed, the worker controller may pass the second synchronization barrier and perform additional jobs or become available for allocation. Upon reaching the second synchronization barrier, the worker controller reads from a shared DM of the worker controller to determine if all of the jobs included in the first segment of the control code have been executed.

In one or more embodiments, when the lead controller reads the indication that the second segment of the control code has been executed from the shared DM of the lead controller, the lead controller writes an indication that the first segment of the control code has been executed to the shared DM of the worker controller and then the lead controller passes the first synchronization barrier. After passing the first synchronization barrier, the lead controller becomes available for allocation (e.g., to execute an additional segment of control code). When the worker controller reads the indication that the first segment of the control code has been executed from the shared DM of the worker controller, the worker controller passes the second synchronization barrier. In various embodiments, passing the second synchronization barrier causes the worker controller to become available for allocation (e.g., to execute an additional segment of control code). Notably, the lead controller and the worker controller maintain synchronization using local DM reads and one remote DM write because of the first and second synchronization barriers. Performing one remote DM write is more efficient than performing multiple remote DM reads, and the first and second synchronization barriers facilitate this improvement in efficiency. By leveraging the register-based interpreter and synchronization barriers, the described systems are capable of executing workloads across an array of parallel controllers and maintaining synchronization both at the job level and at the control code segment level.

FIG. 1 is a block diagram of a hardware accelerator array 105, according to an example. In this example, the hardware accelerator array 105 includes a plurality of circuit blocks, or tiles, illustrated here as the DPEs 110 (also referred to as DPE tiles or compute tiles), interface tiles 104, and memory tiles 106. Memory tiles 106 may be referred to as shared memory and/or shared memory tiles. Interface tiles 104 may be referred to as shim tiles, and may be collectively referred to as an array interface 128. The hardware accelerator array 105 is coupled to a NoC 115, which couples the array 105 to other components in the same IC (or same SoC) such as a CPU, graphics processing unit (GPU), memory controller, and the like. FIG. 1 further illustrates that the interface tiles 104 communicatively couple the other tiles in the hardware accelerator array 105 (i.e., the DPEs 110 and memory tiles 106) to the NoC 115.

DPEs 110 can include one or more processing cores, program memory (PM), data memory (DM), DMA circuitry, and stream interconnect (SI) circuitry. For example, the core(s) is the DPEs 110 can execute program code stored in the PM. The core(s) may include, without limitation, a scalar processor and/or a vector processor. DM may be referred to herein as local memory or local data memory, in contrast to the memory tiles 106 which have memory that is external to the DPE tiles, but still within the hardware accelerator array 105.

The core(s) in the DPEs 110 may directly access data memory of other DPE tiles via DMA circuitry. The core(s) may also access DM of adjacent (or neighboring) DPEs 110 via DMA circuitry and/or DMA circuitry of the adjacent compute tiles. In one embodiment, DM in one DPE 110 and DM of adjacent DPE tiles may be presented to the core(s) as a unified region of memory. In one embodiment, the core(s) in one DPE 110 may access data memory of non-adjacent DPEs 110. Permitting cores to access data memory of other DPE tiles may be useful to share data amongst the DPEs 110.

The hardware accelerator array 105 may include direct core-to-core cascade connections amongst DPEs 110. Direct core-to-core cascade connections may include unidirectional and/or bidirectional direct connections. Core-to-core cascade connections may be useful to share data amongst cores of the DPEs 110 with relatively low latency (e.g., the data does not traverse stream interconnect circuitry, and the data does not need to be written to data memory of an originating DPE and read by a recipient or destination DPE). For example, a direct core-to-core cascade connection may be useful to provide results from an accumulation register of a processing core of an originating DPE directly to a processing core(s) of a destination DPE.

In an embodiment, DPEs 110 do not include cache memory. Omitting cache memory may be useful to provide predictable/deterministic performance. Omitting cache memory may also be useful to reduce processing overhead associated with maintaining coherency among cache memories across the DPEs 110.

In an embodiment, processing cores of the DPE 110 do not utilize input interrupts. Omitting interrupts may be useful to permit the processing cores to operate uninterrupted. Omitting interrupts may also be useful to provide predictable and/or deterministic performance.

One or more DPEs 110 may include special purpose or specialized circuitry, or may be configured as special purpose or specialized compute tiles such as, without limitation, digital signal processing engines, cryptographic engines, forward error correction (FEC) engines, and/or artificial intelligence (AI) engines.

In an embodiment, the DPEs 110, or a subset thereof, are substantially identically to one another (i.e., homogenous compute tiles). Alternatively, one or more DPEs 110 may differ from one other more other DPEs 110 (i.e., heterogeneous compute tiles).

Memory tile 106-1 includes memory 118 (e.g., random access memory or RAM), DMA circuitry 120, and stream interconnect (SI) circuitry 122.

Memory tile 106-1 may lack or omit computational components such as an instruction processor or a core. In an embodiment, memory tiles 106, or a subset thereof, are substantially identical to one another (i.e., homogenous memory tiles). Alternatively, one or more memory tiles 106 may differ from one other more other memory tiles 106 (i.e., heterogeneous memory tiles). A memory tile 106 may be accessible to multiple DPEs 110. Memory tiles 106 may thus be referred to as shared memory.

Data may be moved between/amongst memory tiles 106 via DMA circuitry 120 and/or stream interconnect circuitry 122 of the respective memory tiles 106. Data may also be moved between/amongst data memory of a DPE 110 and memory 118 of a memory tile 106 via DMA circuitry and/or stream interconnect circuitry of the respective tiles. For example, DMA circuitry in a DPE 110 may read data from its data memory and forward the data to memory tile 106-1 in a write command, via stream interconnect circuitry in the DPE 110 and stream interconnect circuitry 122 in the memory tile 106. DMA circuitry 124 of memory tile 106-1 may then write the data to memory 118. As another example, DMA circuitry 120 of memory tile 106-1 may read data from memory 118 and forward the data to a DPE 110 in a write command, via stream interconnect circuitry 122 and stream interconnect circuitry in the DPE 110, and DMA circuitry in the DPE 110 can write the data to its data memory.

Array interface 128 interfaces between the hardware accelerator array 105 (e.g., DPEs 110 and memory tiles 106) and the NoC 115. Interface tile 104-1 (also referred to as a shim tile) includes DMA circuitry 124, stream interconnect circuitry 126, and a controller 127. Interface tiles 104 may be interconnected so that data may be propagated amongst interface tiles 104 bi-directionally. An interface tile 104 may operate as an interface for column of DPEs 110 (e.g., as an interface to the NoC 115). Interface tiles 104 may be connected such that data may propagate from one interface tile 104 to another interface tile 104 bi-directionally.

In an embodiment, interface tiles 104, or a subset thereof, are substantially identically to one another (i.e., homogenous interface tiles). Alternatively, one or more interface tiles 104 may differ from one other more other interface tiles 104 (i.e., heterogeneous interface tiles).

In an embodiment, one or more interface tiles 104 are configured as a NoC interface tile (e.g., as primary and/or secondary device) that interfaces between the DPEs 110 and the NoC 115 (e.g., to access other components in the SoC). While FIG. 1 illustrates coupling a subset of the interface tiles 104 to the NoC 115, in one embodiment, each of the interface tiles 104-1-5 is connected to the NoC 115. Doing so may permit different applications to control and use different columns of the memory tiles 106 and DPEs 110.

The controllers 127 in each of the interface tiles 104 can program or configure the DMA circuitry and stream interconnect circuitry of the hardware accelerator array 105 to provide desired functionality and/or connections to move data between/amongst DPEs 110, memory tiles 106, and the NoC 115. This enables the DPEs 110 to perform a desired operation (e.g., a ML function). The DMA circuitry and stream interconnect circuitry of the hardware accelerator array 105 may include, without limitation, switches and/or multiplexers that are configurable to establish signal paths within, amongst, and/or between tiles of the hardware accelerator array 105. The hardware accelerator array 105 may further include configurable Advanced extensible Interface (AXI) AXI interface circuitry. The DMA circuitry, the stream interconnect circuitry, and/or AXI interface circuitry may be configured or programmed by storing configuration parameters in configuration registers, configuration memory (e.g., configuration random access memory or CRAM), and/or eFuses, and coupling read outputs of the configuration registers, CRAM, and/or eFuses to functional circuitry (e.g., to a control input of a multiplexer or switch), to maintain the functional circuitry in a desired configuration or state. In an embodiment, the core(s) of DPEs 110 configure the DMA circuitry and stream interconnect circuitry of the respective DPEs 110 based on core code stored in PM of the respective DPEs 110. The controllers 127 in each column can configure DMA circuitry and stream interconnect circuitry of memory tiles 106 and interface tiles 104 in that particular column based on controller code. Moreover, in one embodiment, the controllers 127 in each column can configure DMA circuitry for the DPEs 110 in their respective columns.

While FIG. 1 illustrates a controller 127 per column, there may be other arrangements where multiple controllers are tasked with controlling different subsets of tiles in the hardware accelerator. For example, the array may include a controller in every other column, where each controller is tasked with controlling tiles in two columns. In another example, there may be multiple controllers per column where each controller is tasked with controlling a different subset of tiles within the column.

In one embodiment, the controllers 127 are microprocessors. The controllers 127 can be hardened circuitry that executes software code (or firmware) that controls the DPE. In one embodiment, the only task of the controllers 127 is to control and orchestrate the functions performed by the array 105. However, in other embodiments, other tasks may be performed by the controllers 127, such as moving data into and out of the array 105 using the NoC 115. For example, the controllers 127 may communicate with a memory controller (not shown) to store data in, or retrieve data from, the memory (either in the same IC as the array 105 or on a different IC). In this example, the controllers 127 may execute different specialized code depending on the task a CPU has currently assigned to the array 105.

The hardware accelerator array 105 may include a hierarchical memory structure. For example, data memory of the DPEs 110 may represent a first level (L1) of memory, memory 118 of memory tiles 106 may represent a second level (L2) of memory, and external memory outside the hardware accelerator array 105 may represent a third level (L3) of memory. Memory capacity may progressively decrease with each level (e.g., memory 118 of memory tile 106 may have more storage capacity than data memory in the DPEs 110, and external memory may have more storage capacity than data memory 118 of the memory tiles 106). The hierarchical memory structure is not, however, limited to the foregoing examples.

As an example, in an artificial intelligence (AI) application, an input tensor may be relatively large (e.g., 1 megabyte or MB). Local data memory in the DPEs 110 may be significantly smaller (e.g., 64 kilobytes or KB). The controller 127 may segment an input tensor and store the segments in respective blocks of shared memory tiles 106.

Figure 2:
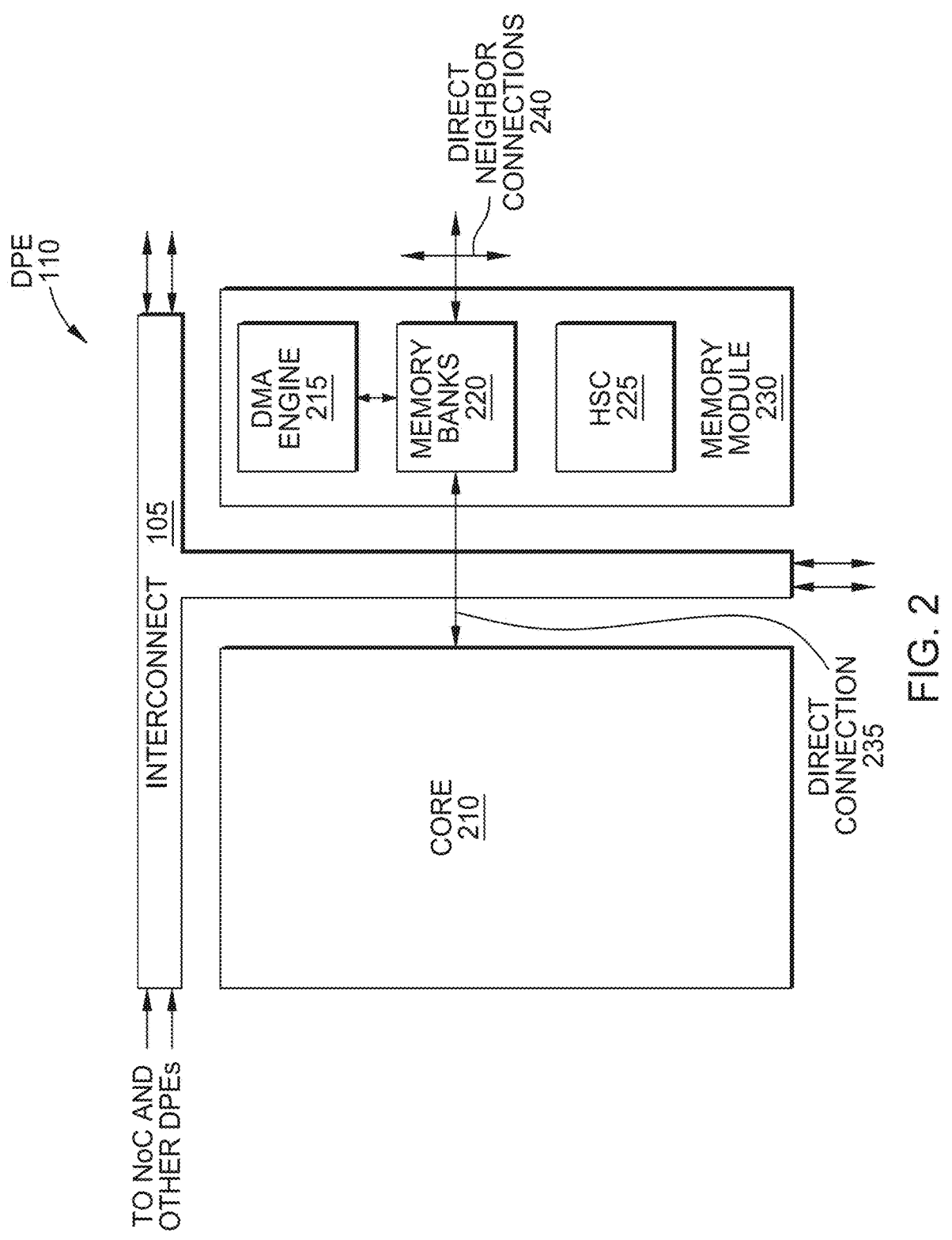
FIG. 2 is a block diagram of a data processing engine, according to an example.

FIG. 2 is a block diagram of a DPE, according to an example. In this example, FIG. 2 illustrates one implementation of the DPE 110 in the hardware accelerator array 105 illustrated in FIG. 1, according to an example. The DPE 110 includes an interconnect 205, a core 210, and a memory module 230. The interconnect 205 permits data to be transferred from the core 210 and the memory module 230 to different cores in the array. That is, the interconnect 205 in each of the DPEs 110 may be connected to each other so that data can be transferred north and south (e.g., up and down) as well as east and west (e.g., right and left) between the DPEs 110 in the array.

For example, the DPEs 110 in an upper row of the array rely on the interconnects 205 in the DPEs 110 in a lower row to communicate with the NoC 115 shown in FIG. 2. For example, to transmit data to the NoC, a core 210 in a DPE 110 in the upper row transmits data to its interconnect 205 which is in turn communicatively coupled to the interconnect 205 in the DPE 110 in the lower row. The interconnect 205 in the lower row is connected to the NoC. The process may be reversed where data intended for a DPE 110 in the upper row is first transmitted from the NoC to the interconnect 205 in the lower row and then to the interconnect 205 in the upper row that is the target DPE 110. In this manner, DPEs 110 in the upper rows may rely on the interconnects 205 in the DPEs 110 in the lower rows to transmit data to and receive data from the NoC.

In one embodiment, the interconnect 205 includes a configurable switching network that permits the user to determine how data is routed through the interconnect 205. In one embodiment, unlike in a packet routing network, the interconnect 205 may form streaming point-to-point connections. That is, the streaming connections and streaming interconnects (not shown in FIG. 2) in the interconnect 205 may form routes from the core 210 and the memory module 230 to the neighboring DPEs 110 or the NoC. Once configured, the core 210 and the memory module 230 can transmit and receive streaming data along those routes. In one embodiment, the interconnect 205 is configured using the AXI Streaming protocol. However, when communicating with the NoC, the DPEs 110 may use the AXI memory mapped (MM) protocol.

In addition to forming a streaming network, the interconnect 205 may include a separate network for programming or configuring the hardware elements in the DPE 110. Although not shown, the interconnect 205 may include a memory mapped interconnect (e.g., AXI MM) which includes different connections and switch elements used to set values of configuration registers in the DPE 110 that alter or set functions of the streaming network, the core 210, and the memory module 230.

In one embodiment, streaming interconnects (or network) in the interconnect 205 support two different modes of operation referred to herein as circuit switching and packet switching. In one embodiment, both of these modes are part of, or compatible with, the same streaming protocol—e.g., an AXI Streaming protocol. Circuit switching relies on reserved point-to-point communication paths between a source DPE 110 to one or more destination DPEs 110. In one embodiment, the point-to-point communication path used when performing circuit switching in the interconnect 205 is not shared with other streams (regardless of whether those streams are circuit switched or packet switched). However, when transmitting streaming data between two or more DPEs 110 using packet-switching, the same physical wires can be shared with other logical streams.

The core 210 may include hardware elements for processing digital signals. For example, the core 210 may be used to process signals related to wireless communication, radar, vector operations, machine learning (ML)/AI applications, and the like. As such, the core 210 may include program memories, an instruction fetch/decode unit, fixed-point vector units, floating-point vector units, arithmetic logic units (ALUs), multiply accumulators (MAC), and the like. However, as mentioned above, this disclosure is not limited to DPEs 110. The hardware elements in the core 210 may change depending on the engine type. That is, the cores in an AI engine, digital signal processing engine, cryptographic engine, or FEC may be different.

The memory module 230 includes a DMA engine 215, memory banks 220, and hardware synchronization circuitry (HSC) 225 or other type of hardware synchronization block. In one embodiment, the DMA engine 215 enables data to be received by, and transmitted to, the interconnect 205. That is, the DMA engine 215 may be used to perform DMA reads and write to the memory banks 220 using data received via the interconnect 205 from the NoC or other DPEs 110 in the array.

The memory banks 220 can include any number of physical memory elements (e.g., SRAM). For example, the memory module 230 may be include 4, 8, 16, 32, etc. different memory banks 220. In this embodiment, the core 210 has a direct connection 235 to the memory banks 220. Stated differently, the core 210 can write data to, or read data from, the memory banks 220 without using the interconnect 205. That is, the direct connection 235 may be separate from the interconnect 205. In one embodiment, one or more wires in the direct connection 235 communicatively couple the core 210 to a memory interface in the memory module 230 which is in turn coupled to the memory banks 220.

In one embodiment, the memory module 230 also has direct connections 240 to cores in neighboring DPEs 110. Put differently, a neighboring DPE in the array can read data from, or write data into, the memory banks 220 using the direct neighbor connections 240 without relying on their interconnects or the interconnect 205 shown in FIG. 2. The HSC 225 can be used to govern or protect access to the memory banks 220. In one embodiment, before the core 210 or a core in a neighboring DPE can read data from, or write data into, the memory banks 220, the core (or the DMA engine 215) requests a lock acquire to the HSC 225 when it wants to read or write to the memory banks 220 (i.e., when the core/DMA engine want to "own" a buffer, which is an assigned portion of the memory banks 220. If the core or DMA engine does not acquire the lock, the HSC 225 will stall (e.g., stop) the core or DMA engine from accessing the memory banks 220. When the core or DMA engine is done with the buffer, they release the lock to the HSC 225. In one embodiment, the HSC 225 synchronizes the DMA engine 215 and core 210 in the same DPE 110 (i.e., memory banks 220 in one DPE 110 are shared between the DMA engine 215 and the core 210). Once the write is complete, the core (or the DMA engine 215) can release the lock which permits cores in neighboring DPEs to read the data.

Because the core 210 and the cores in neighboring DPEs 110 can directly access the memory module 230, the memory banks 220 can be considered as shared memory between the DPEs 110. That is, the neighboring DPEs can directly access the memory banks 220 in a similar way as the core 210 that is in the same DPE 110 as the memory banks 220. Thus, if the core 210 wants to transmit data to a core in a neighboring DPE, the core 210 can write the data into the memory bank 220. The neighboring DPE can then retrieve the data from the memory bank 220 and begin processing the data. In this manner, the cores in neighboring DPEs 110 can transfer data using the HSC 225 while avoiding the extra latency introduced when using the interconnects 205. In contrast, if the core 210 wants to transfer data to a non-neighboring DPE in the array (i.e., a DPE without a direct connection 240 to the memory module 230), the core 210 uses the interconnects 205 to route the data to the memory module of the target DPE which may take longer to complete because of the added latency of using the interconnect 205 and because the data is copied into the memory module of the target DPE rather than being read from a shared memory module.

In addition to sharing the memory modules 230, the core 210 can have a direct connection to cores 210 in neighboring DPEs 110 using a core-to-core communication link (not shown). That is, instead of using either a shared memory module 230 or the interconnect 205, the core 210 can transmit data to another core in the array directly without storing the data in a memory module 230 or using the interconnect 205 (which can have buffers or other queues). For example, communicating using the core-to-core communication links may use less latency (or have high bandwidth) than transmitting data using the interconnect 205 or shared memory (which requires a core to write the data and then another core to read the data) which can offer more cost effective communication. In one embodiment, the core-to-core communication links can transmit data between two cores 210 in one clock cycle. In one embodiment, the data is transmitted between the cores on the link without being stored in any memory elements external to the cores 210. In one embodiment, the core 210 can transmit a data word or vector to a neighboring core using the links every clock cycle, but this is not a requirement.

In one embodiment, the communication links are streaming data links which permit the core 210 to stream data to a neighboring core. Further, the core 210 can include any number of communication links which can extend to different cores in the array. In this example, the DPE 110 has respective core-to-core communication links to cores located in DPEs in the array that are to the right and left (east and west) and up and down (north or south) of the core 210. However, in other embodiments, the core 210 in the DPE 110 illustrated in FIG. 2 may also have core-to-core communication links to cores disposed at a diagonal from the core 210. Further, if the core 210 is disposed at a bottom periphery or edge of the array, the core may have core-to-core communication links to only the cores to the left, right, and bottom of the core 210.

However, using shared memory in the memory module 230 or the core-to-core communication links may be available if the destination of the data generated by the core 210 is a neighboring core or DPE. For example, if the data is destined for a non-neighboring DPE (i.e., any DPE that DPE 110 does not have a direct neighboring connection 240 or a core-to-core communication link), the core 210 uses the interconnects 205 in the DPEs to route the data to the appropriate destination. As mentioned above, the interconnects 205 in the DPEs 110 may be configured when the SoC is being booted up to establish point-to-point streaming connections to non-neighboring DPEs to which the core 210 will transmit data during operation.

Figure 3:
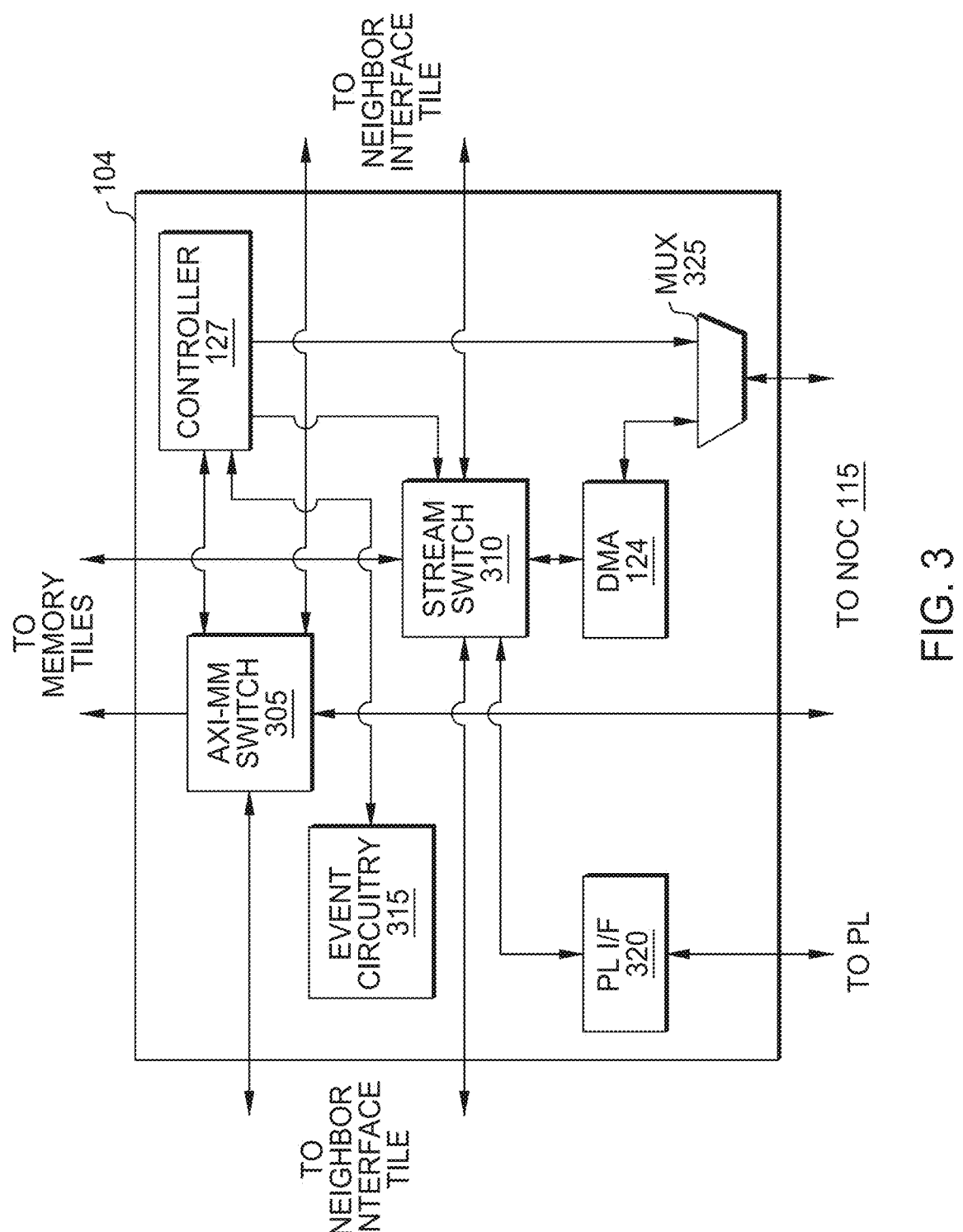
FIG. 3 is a block diagram of an interface tile, according to an example.

FIG. 3 is a block diagram of an interface tile, according to an example. FIG. 3 is a block diagram of an interface tile 104 in the hardware accelerator array 105 illustrated in FIG. 1, according to an example.

The interface tile 104 includes the controller 127 and the DMA 124, as shown in FIG. 1. In addition, the interface tile 104 includes an AXI-MM switch 305, a stream switch 310, event circuitry 315, and a programmable logic (PL) interface (I/F) 320. In this example, the AXI-memory mapped (MM) switch 305 and the stream switch 310 can be used to move different types of data. While the interface tile 104 includes two different types of switches (e.g., MM and streaming), in other embodiments, the interface tile 104 may have only one switch that uses one data transfer protocol (e.g., only MM).

The event circuitry 315 can be used to push notifications of events occurring in the interface tile 104 (or events in different components in the interface tile 104 such as the controller 127) to other tiles. Although not shown, there may be an event network (separate from the MM network and streaming network which includes the switches 305 and 310) for broadcasting events occurring in the tile 104 to other tiles or to components outside the hardware accelerator (e.g., a CPU).

In this example, the DMA 124 (e.g., a DMA engine) for the interface tile 104 is coupled to the stream switch 310 and to a multiplexer (mux) 325. The DMA 124 can use the stream switch to communicate with other tiles in the hardware accelerator. The DMA 124 can use the mux 325 to communicate with the NoC 115 (e.g., to fetch data from memory).

The mux 325 is also coupled to the controller 127, which can have its own DMA engine. Thus, the mux 325 can permit the DMA 124 for the interface tile 104 or the DMA in the controller 127 to access the NoC 115 in order to move data into, or out of, the interface tile 104.

The PL I/F 320 is coupled to the stream switch 310 and permits the interface tile 104 to communicate with PL. That is, in this example, the interface tile 104 can directly communicate with the NoC 115 and PL, which is external to the hardware accelerator. However, a SoC that includes the hardware accelerator may not include PL, in which case the PL I/F 320 may be omitted.

The controller 127 is coupled to both the AXI-MM switch 305 and the stream switch 310. The controller 127 can uses these switches to communicate with neighboring interface tiles in the array, as well as to memory tiles. The memory tiles can include interconnects to the DPE tiles, thereby permitting the controller 127 (and the interface tile 104) to communicate with the DPE tiles via the memory tiles. Thus, in this example, the controller 127 can use both the MM and streaming protocols to communicate with other tiles in the hardware accelerator array.

Figure 4:
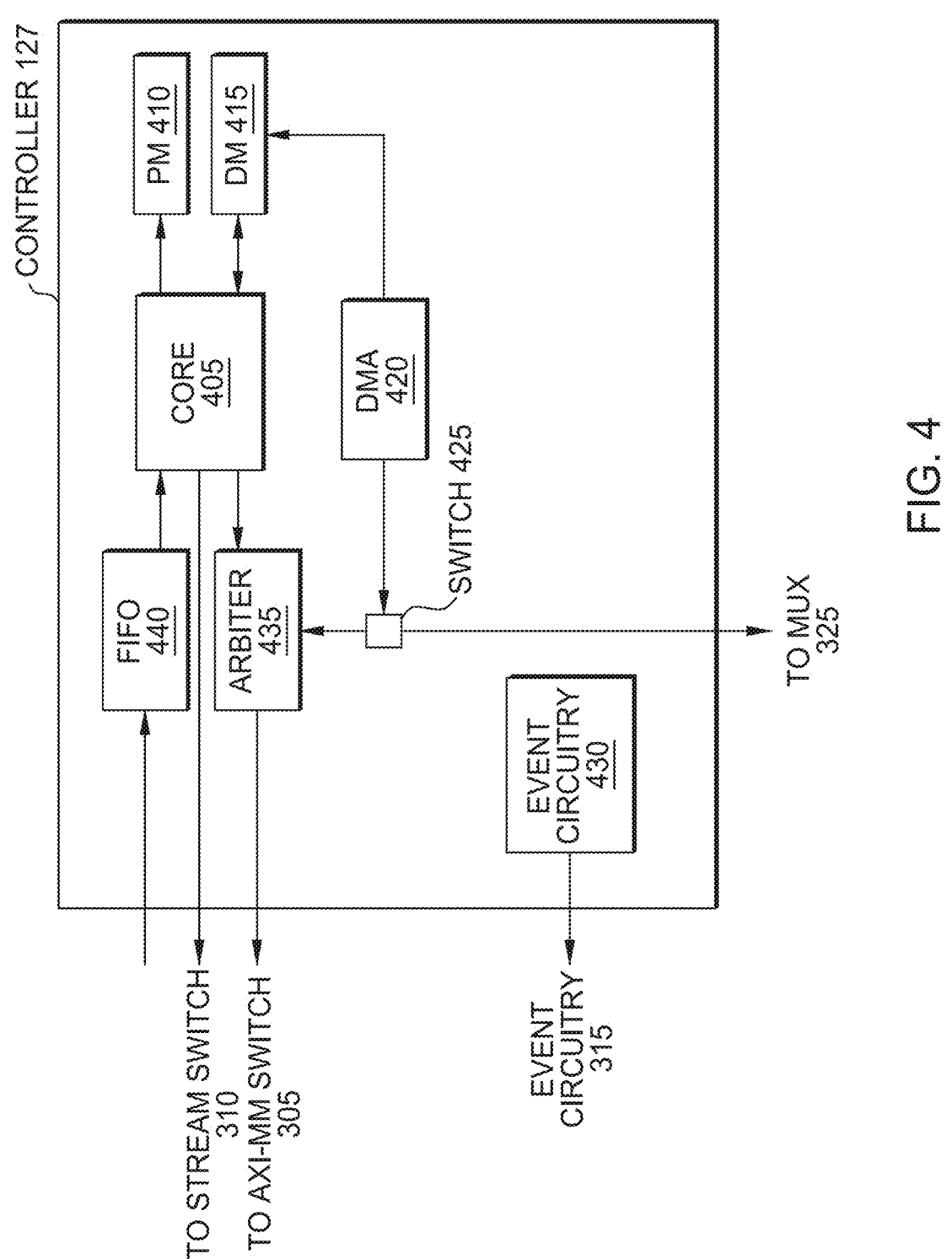
FIG. 4 is a block diagram of a controller, according to an example.

FIG. 4 is a block diagram of a controller, according to an example. FIG. 4 illustrates one implementation of the controller 127 in the interface tile 104 illustrated in FIG. 3, according to an example.

The controller 127 includes a core 405 which includes circuitry (i.e., hardware) for executing a program defined by code stored in a program memory (PM) 410. The core 405 is not limited to any particular type of circuitry, but some non-limiting examples include a RISC-V processor, a scalar processor, a soft-core processor implemented using logic synthesis, and the like.

The controller 127 also includes DMA 420 (e.g., DMA circuitry or a DMA engine) coupled to a switch 425 in order to communicate with the mux 325 in the interface tile as shown in FIG. 3. In one embodiment, the DMA 420 fetches commands from a compiled binary which are then loaded into a DM 415 (e.g., a local memory that is accessible to both the core 405 and the DMA 420). These commands may be high level instructions for, e.g., an AI or ML application that are carried out by the DPEs in the hardware accelerator.

The core 405 can retrieve these commands from the DM 415 and convert them into low-level instructions for the various tiles in the hardware accelerator (e.g., the MEM and DPE tiles) in order to complete the high-level commands. That is, the core 405 can execute the program defined by the code in the PM 410 in order to convert the commands from the binary into low-level instructions (e.g., register writes) for the various tiles in the accelerator. This is discussed in more detail in FIG. 5.

The arbiter 435 enables the core 405 and the DMA 420 to share access to the AXI-MM switch 305 in the interface tile in FIG. 3. In one embodiment, the core 405 uses the AXI-MM switch 305 to transmit the low-level instructions to the other tiles in the hardware accelerator. In one embodiment, the controller 127 transmits instructions only to the tiles in the same column in the array. For example, the hardware accelerator may have a controller in each column that controls the tiles (e.g., the DPE and MEM tiles) in that column.

The core 405 can receive completion signals (e.g., completion tokens) from the stream switch 310 in the interface tile. The controller 127 includes a FIFO 440 for buffering these tokens. For example, when a DPE tile sends a completion signal that it has completed the previous instruction issued to it from the core 405, the core 405 can then fetch new commands from the DM 415 and provide the tile with new instructions. This is discussed in more detail with respect to FIG. 8.

The controller 127 also includes event circuitry 430 which is communicatively coupled to the event circuitry 315 in the interface tile shown in FIG. 3. The event circuitry 430 can report events that occur in the controller 127 to the event circuitry 315 in the interface tile for distribution. For example, the controller 127 may have error correction abilities such as using error correction codes (ECC). If an error is detected, the event circuitry 430 can report it. The event circuitry 430 enables the controller 127 to tell the other components in the hardware accelerator that something went wrong in the controller 127. Although not shown, the controller 127 can also include circuitry for performing a software reset or performing clock gating for the controller 127.

Figure 5:
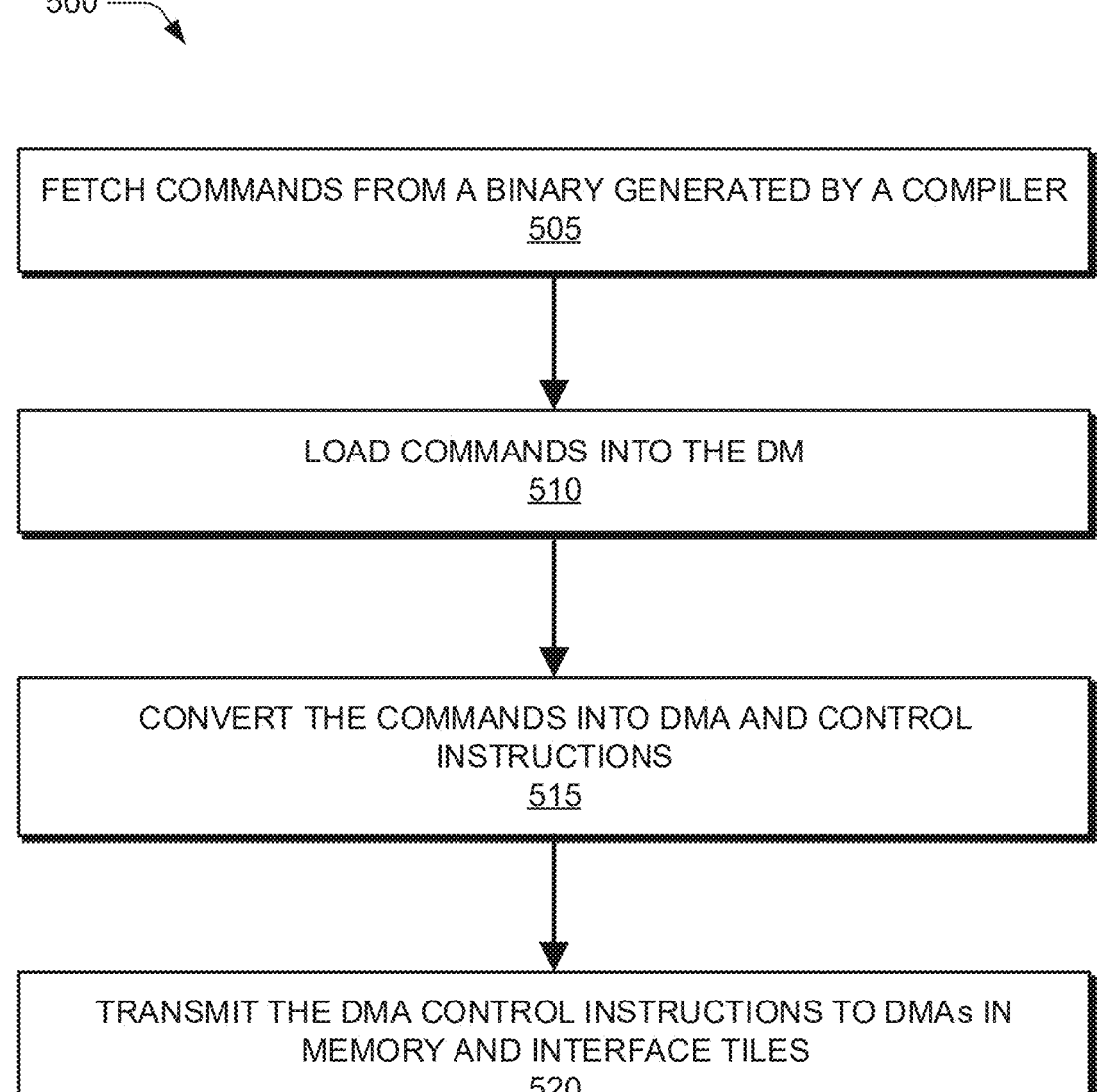
FIG. 5 is a flowchart of a method for operating a controller, according to an example.

FIG. 5 is a flowchart of a method 500 for operating a controller, e.g., the controller 127 shown in FIG. 4. At block 505, the DMA in the controller fetches commands from a binary generated by a compiler. As one example, a compiler may compile an ML model to generate a binary. The binary can then be loaded into memory that is accessible to the controller. The binary can include high-level commands such as ML operations like executing a convolution, RELU, softmax, and the like.

In one embodiment, because there are multiple controllers in the hardware accelerator array, the binary may be divided into commands for different controllers. That is, the compiler may be aware of the multiple controllers in the array and split the binary such that different portions have commands for different controllers.

At block 510, the DMA loads the fetched commands into the DM shared with the core of the controller.

At block 515, the core retrieves the commands from the DM and coverts the commands into DMA and control instructions. In one embodiment, the core executes a program (e.g., stored in the PM 410 in FIG. 4) that enables the core to convert (or interpret) the commands. The PM may be loaded with different code (or program) depending on the job being executed. For example, different ML models can have different sequence of commands, and thus, a different program may be used by the core when converting commands into low-level DMA and control instructions.

In one embodiment, the DMA and control instructions include register writes to control operations of the DPEs. These instructions can also include buffer descriptors for performing DMA operations.

At block 520, the core transmits the DMA and control instructions to DMA engines in other tiles for execution. For instance, the DMA and control instructions may be transmitted to the DMA engine on the same interface tile as the controller, as well as DMA engines in MEM tiles and DPEs.

In one embodiment, the DMA and control instructions are transmitted only to tiles in the same column as the controller. However, in other embodiments, the controller may be tasked with controlling tiles in multiple columns, or only a subset of tiles in a column.

In one embodiment, the controller uses an AXI-MM network to send the DMA and control instructions to DMA engines in the tiles. Once the tiles complete the instructions, they can send completion signals (e.g., tokens) back to the controller. In one embodiment, these completion signals are transmitted to the controller using a different network—e.g., a streaming network.

After receiving the completion signal from a tile, the controller can fetch more commands from the DM and provide new DMA and control instructions (e.g., new register writes or buffer descriptors) to the tile. That is, the core can repeat blocks 515 and 520 as the tiles complete the previously provided instructions.

Figure 6:
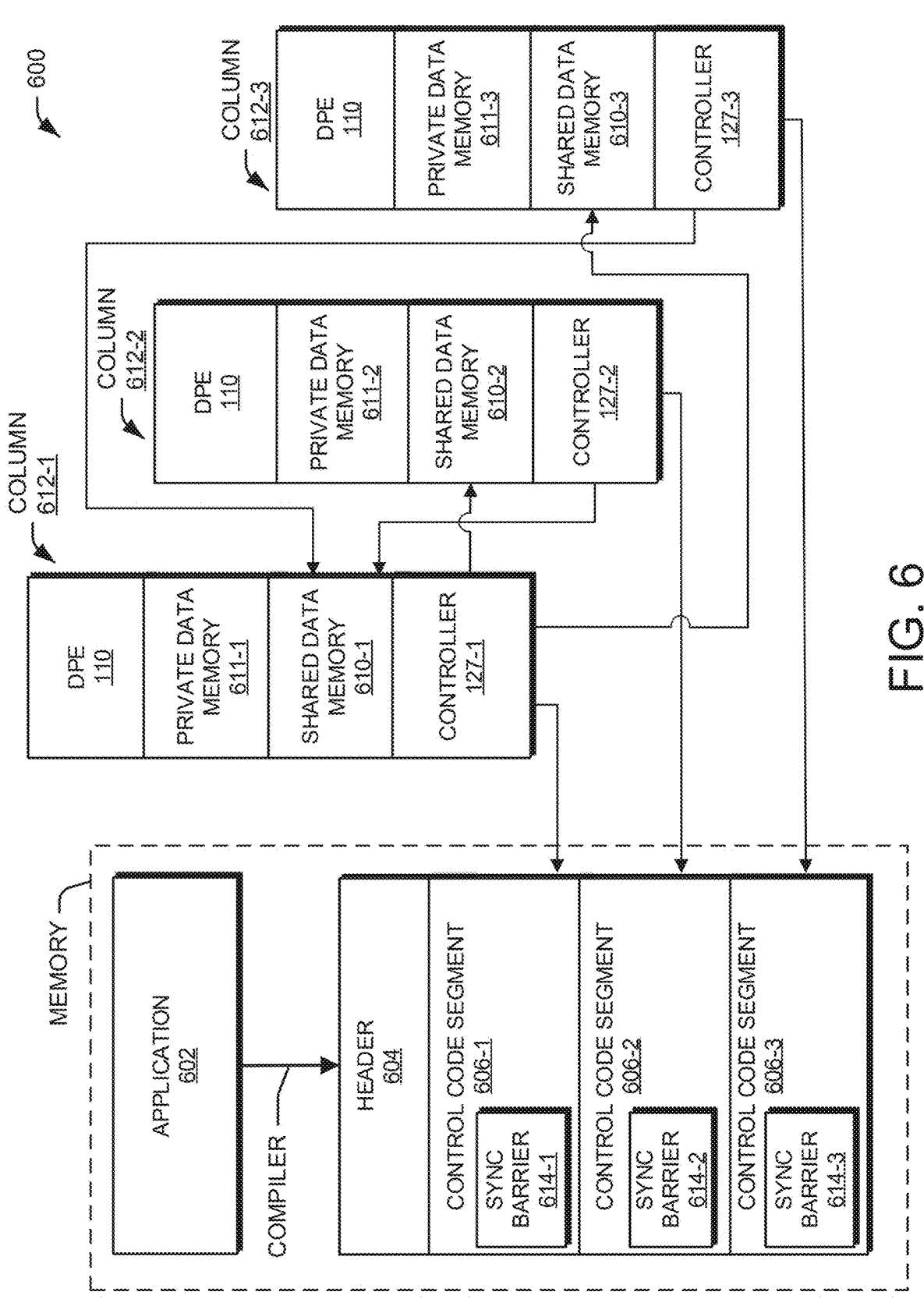
FIG. 6 illustrates an array of controllers, according to an example.

FIG. 6 illustrates an array 600, according to an example. As shown, a user defined application 602 is received in a memory such as a dynamic random access memory (DRAM), a random access memory (RAM), or another memory. In various examples, the user defined application 602 is to be executed across the array 600 in accordance with a virtual instruction set architecture (ISA). In some embodiments, control code is compiled based on the virtual ISA and one or more instructions included in the user defined application 602. For example, a compiler compiles the one or more instructions included in the user defined application 602 into the control code. In some embodiments, the control code can include the compiled binary described with respect to FIG. 4.

The control code is illustrated to include a header 604 and control code segments 606-1, 606-2, 606-3. In one or more embodiments, the header 604 is an Executable and Linkable Format (ELF) header. For example, the control code segments 606-1, 606-2, 606-3 can include the commands from the compiled binary described above. In some examples, each of the control code segments 606-1, 606-2, 606-3 include one or more jobs which are sets of sequential operations. In certain embodiments, the jobs may correspond to the one or more instructions included in the user defined application 602.

In an example, the array 600 includes controllers 127-1, 127-2, 127-3 as described in the figures above. In one or more examples, the virtual ISA describes types of instructions which can be executed by controllers 127-1, 127-2, 127-3, and the control code segments 606-1, 606-2, 606-3 include instances of the types of instructions corresponding to the user defined application 602. In various embodiments, the one or more instructions included in the user defined application 602 are executable by executing one or more jobs included in the control code segments 606-1, 606-2, 606-3.

In order to ensure that the one or more jobs included in the control code segments 606-1, 606-2, 606-3 are executed in an order based on the one or more instructions included in the user defined application 602, the control code segments 606-1, 606-2, 606-3 include synchronization barriers 614-1, 614-2, 614-3, respectively. Notably, the synchronization barriers 614-1, 614-2, 614-3 facilitate synchronization of the control code segment 606-1, 606-2, 606-3 in a manner in which the controllers 127-1, 127-2, 127-3 perform local reads and one remote write which is more efficient that performing multiple remote reads for synchronization. In some examples, the synchronization barriers 614-1, 614-2, 614-3 are one or more lines of code configured to synchronize execution of the one or more jobs included in the control code segments 606-1, 606-2, 606-3 by preventing the controllers 127-1, 127-2, 127-3 from becoming available for reallocation before the control code segments 606-1, 606-2, 606-3 have been executed. For example, when a first controller of the controllers 127-1, 127-2, 127-3 executing one or more jobs included in the control code segment 606-1 reaches the synchronization barrier 614-1, the synchronization barrier 614-1 can cause the first controller to determine that a first event has occurred before passing the synchronization barrier 614-1. In an example, the first event may be completion of one or more jobs included in the control code segment 606-2 and the control code segment 606-3. Similarly, when a second controller of the controllers 127-1, 127-2, 127-3 executing one or more jobs included in the control code segment 606-2 reaches the synchronization barrier 614-2, the synchronization barrier 614-2 may cause the second controller to determine that a second event has occurred before passing the synchronization barrier 614-2. In various examples, the second event can be completion of one or more jobs included in the control code segment 606-1 and the control code segment 606-3.

In some embodiments, the controller 127-1 is designated as a lead controller for executing the control code segments 606-1, 606-2, 606-3 because the controller 127-1 is a first controller included in the array 600 (or a first controller included in a subset of the array 600). In these embodiments, the controller 127-2 and the controller 127-3 are designated as worker controllers for executing the control code segments 606-1, 606-2, 606-3. It is to be appreciated that, in other embodiments, the lead and/or the worker controllers can be designated in a variety of different ways.

In the illustrated example, the controller 127-1 is included in a column 612-1, and the controller 127-1 is associated with a shared data memory 610-1, a private data memory 611-1, and one or more DPEs 110. The shared data memory 610-1 may be internal memory within the controller 127-1 (e.g., the DM 415 illustrated in FIG. 4) or memory external to the controller 127-1 (e.g., memory in a memory tile 106 or an interface tile 104 illustrated in FIG. 1). The column 612-1 can be one of the columns of the hardware accelerator array 105 illustrated in FIG. 1. For example, the column 612-1 can include one or more of the memory tiles 106 and one or more of the interface tiles 104. The controller 127-1 may be disposed in one of the interface tiles 104.

Similarly, the controller 127-2 is included in a column 612-2 and the controller 127-3 is included in a column 612-3. The controller 127-2 is associated with a shared data memory 610-2, a private data memory 611-2, and one or more DPEs 110. The controller 127-3 is associated with a shared data memory 610-3, a private data memory 611-3, and one or more DPEs 110. In one or more examples, since the controller 127-1 is designated as the lead controller, the controller 127-1 executes firmware which causes the controller 127-1 to assign the control code segment 606-1 to the controller 127-1 for execution, the control code segment 606-2 to the controller 127-2 for execution, and the control code segment 606-3 to the controller 127-3 for execution. As shown in FIG. 6, the control code segments 606-1, 606-2, 606-3 include synchronization barriers 614-1, 614-2, 614-3, respectively. In some examples, the synchronization barriers 614-1, 614-2, 614-3 are instructions which ensure that the sets of sequential operations (e.g., the jobs) are executed in an order included in the user defined application 602. If a first job included in the control code segment 606-2 should not be performed before a second job included in the control code segment 606-3 has been performed, then the synchronization barrier 614-2 may prevent the controller 127-2 from performing the first job until the controller 127-3 has performed the second job.

In some examples, the firmware executed by the controller 127-1 is also executed by the controller 127-2 and the controller 127-3. In these examples, the firmware is independent of the user defined application 602 and includes a register-based interpreter having a built-in scheduler hosted on a base operating system (OS) which causes the controllers 127-1, 127-2, 127-3 to execute the control code segments 606-1, 606-2, 606-3, respectively, by executing the jobs included in the control code segments 606-1, 606-2, 606-3. For example, the register-based interpreter cycles through jobs included in the control code segment 606-1 and selects a runnable job to execute. When the currently running job yields or performs an operation such as a DMA, then the currently running job is preempted and a state of the preempted job is maintained in one or more registers of a dedicated register-file accessible by and available to the register-based interpreter of the controller 127-1. In some examples, the built-in scheduler of the register-based interpreter moves to a next runnable job included in the control code segment 606-1, and schedules execution of the next runnable job (e.g., starts execution of the next runnable job). When the preempted job is again runnable, the state of the job is retrieved from the one or more registers of the dedicated register-file by the register-based interpreter, and the job is completed (e.g., resumed) based on the retrieved state. By maintaining states of preempted jobs in the dedicated register-file, the register-based interpreter supports multiple job-contexts with one job live (e.g., running) and the rest in a preempted state. The register-based interpreters of the controllers 127-2, 127-3 cycle through jobs included in the control code segments 606-2, 606-3, respectively, and maintain states of preempted jobs in dedicated register-files in a same manner as described with respect to the register-based interpreter of the controller 127-1 for the control code segment 606-1.

In certain embodiments, when the controller 127-1 has executed the control code segment 606-1 (e.g., by executing each of the jobs included in the control code segment 606-1), the controller 127-1 reaches the synchronization barrier 614-1. For example, the synchronization barrier 614-1 may ensure the controller 127-1 does not execute an additional segment of the control code until the control code segments 606-2, 606-3 have been executed by the controllers 127-2, 127-3, respectively. In this example, the synchronization barrier 614-1 may be one or more lines of code included in the control code segment 606-1 which prevents the controller 127-1 from passing the synchronization barrier 614-1 until indications that the control code segments 606-2, 606-3 have been executed are written to the shared data memory 610-1. In one or more embodiments, the synchronization barrier 614-1 synchronizes execution of segments of the control code with local reads which is more efficient than synchronization using remote reads.

In various embodiments, when the controller 127-2 has executed the control code segment 606-2, the controller 127-2 reaches the synchronization barrier 614-2. For example, the synchronization barrier 614-2 includes one or more lines of code that prevent the controller 127-2 from passing the synchronization barrier 614-2 until an indication that the control code segments 606-1, 606-2, 606-3 have been executed is written to the shared data memory 610-2. In one or more examples, upon reaching the synchronization barrier 614-2, the controller 127-2 writes an indication that the control code segment 606-2 has been executed to the shared data memory 610-1. In some embodiments, when the controller 127-3 has executed the control code segment 606-3, the controller 127-3 reaches the synchronization barrier 614-3. The synchronization barrier 614-3 may include one or more lines of code that prevent the controller 127-3 from passing the synchronization barrier 614-3 until an indication that the control code segments 606-1, 606-2, 606-3 have been executed is written to the shared data memory 610-3. In various examples, upon reaching the synchronization barrier 614-3, the controller 127-3 writes an indication that the control code segment 606-3 has been executed to the shared data memory 610-1.

In one or more embodiments, the controller 127-1 (which is designated as the lead controller for executing the control code in the illustrated example) monitors the shared data memory 610-1 by locally polling the shared data memory 610-1. In some embodiments, locally polling the shared data memory 610-1 is more efficient than remotely polling the controller 127-2 and the controller 127-3 (e.g., writing to the shared data memory 610-1 by the controller 127-2 and the controller 127-3 is a one-time cost). For example, if the controller 127-1 identifies that the indications of the execution of the control code segments 606-2, 606-3 have all been written to the shared data memory 610-1, then the controller 127-1 executes instructions which cause the controller 127-1 to write an indication that the control code segments 606-1, 606-2, 606-3 have been executed to the shared data memory 610-2, and to write an indication that the control code segments 606-1, 606-2, 606-3 have been executed to the shared data memory 610-3. After writing the indications to the shared data memories 610-2, 610-3, the controller 127-1 passes the synchronization barrier 614-1. When the controller 127-2 reads the indication that the control code segments 606-1. 606-2, 606-3 have been executed from the shared data memory 610-2, then the controller 127-2 passes the synchronization barrier 614-2. Similarly, when the controller 127-3 reads the indication that the control code segments 606-1, 606-2, 606-3 have been executed from the shared data memory 610-3, then the controller 127-3 passes the synchronization barrier 614-3. In various embodiments, passing the synchronization barriers 614-1, 614-2, 614-3 causes the controllers 127-1, 127-2, 127-3 to become available for allocation, for example, to execute additional segments of the control code.

Figure 7:
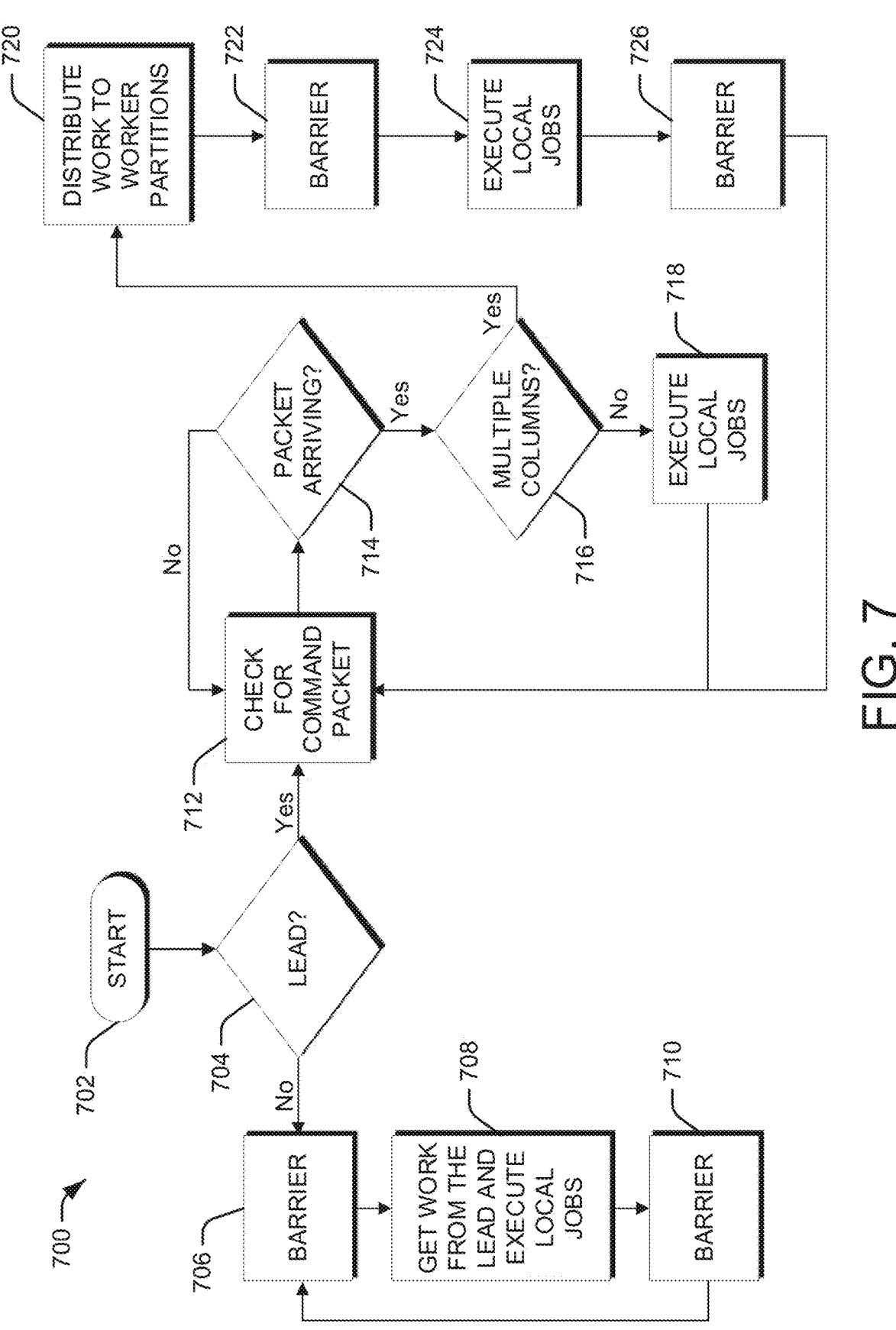
FIG. 7 is a flow diagram illustrating inter-column synchronization, according to an example.

FIG. 7 is a flow diagram 700 illustrating inter-column synchronization, according to an example. The inter-column synchronization illustrated in the flow diagram 700 begins at operation 702. Next, at operation 704, a controller executes firmware to determine whether the controller is designated as a lead controller. If the controller is not designated as a lead controller (no), the flow diagram 700 may proceed to operation 706. For example, at operation 704, the controllers 127-2, 127-3 proceed to operation 706 because the controllers 127-2, 127-3 are not designated as a lead controller.

At operation 706, if the lead controller has reached operation 722, then the controller reaches and passes a synchronization barrier and the flow diagram 700 proceeds to operation 708. At operation 708, the controller receives a control code segment and executes jobs included in the control code segment locally. For example, at operation 708, the controller 127-2 receives the control code segment 606-2 and executes the jobs included in the control code segment 606-2. In another example, at operation 708, the controller 127-3 receives the control code segment 606-3 and executes the jobs included in the control code segment 606-3.

After the controller receives the control code segment and executes the jobs included in control code segment, if the lead controller has reached operation 726, then the flow diagram 700 may proceed to operation 710. At operation 710, the controller reaches and passes a synchronization barrier and the flow diagram 700 proceeds to operation 706 where the controller is available for allocation. For example, at operation 710, the controllers 127-2, 127-3 reach and pass the synchronization barriers 614-2, 614-3, respectively, and become available for allocation.

At operation 704, if the controller is designated as the lead controller (yes), the flow diagram 700 may proceed to operation 712. For example, at operation 704, the controller 127-1 proceeds to operation 712 because the controller 127-1 is designated as the lead controller. At operation 712, the controller checks for a command packet and the flow diagram 700 proceeds to operation 714. At operation 714, the controller determines whether a command packet is arriving.

At operation 714, if the controller determines that a command packet is not arriving (no), the flow diagram 700 may proceed to operation 712. At operation 714, if the controller determines that a command packet is arriving (yes), the flow diagram 700 may proceed to operation 716. At operation 716, the controller determines whether the command packet includes multiple columns.

At operation 716, if the controller determines that the command packet does not include multiple columns (no), the flow diagram 700 may proceed to operation 718. At operation 718, the controller executes jobs included in a control code segment locally, and the flow diagram 700 may proceed to operation 712. At operation 716, if the controller determines that the command packet does include multiple columns (yes), the flow diagram 700 may proceed to operation 720.

At operation 720, the controller distributes control code segments to worker controllers. For example, at operation 720, the controller 127-1 distributes the control code segment 606-2 to the controller 127-2 and the control code segment 606-3 to the controller 127-3. At operation 720, after the controller distributes control code segments to the worker controllers, the flow diagram 700 may proceed to operation 722. At operation 722, the controller reaches and passes a synchronization barrier and causes worker controllers at operation 706 to proceed to operation 708, and the flow diagram 700 proceeds to operation 724.

At operation 724, the controller executes jobs included in the control code segment locally. In an example, at operation 724, the controller 127-1 executes jobs included in the control code segment 606-1. At operation 724, after the controller executes jobs included in the control code segment locally, the flow diagram 700 proceeds to operation 726. At operation 726, the controller reaches and passes a synchronization barrier and causes worker controllers at operation 710 to proceed to operation 706, and the flow diagram 700 proceeds to operation 712. For example, at operation 726, the controller 127-1 reaches and passes the synchronization barrier 614-1, and then becomes available for allocation.

In various embodiments, proceeding from operation 726 to operation 712 by a controller designated as a lead controller and proceeding from operation 710 to operation 706 by one or more controllers designated as worker controllers corresponds to a completion of one distribute handling by multiple controllers. Upon completion of the distribute handling, the lead controller waits (e.g., checks) for an additional packet. Similarly, the one or more worker controllers wait for a distribution from the lead controller.

Figure 8:
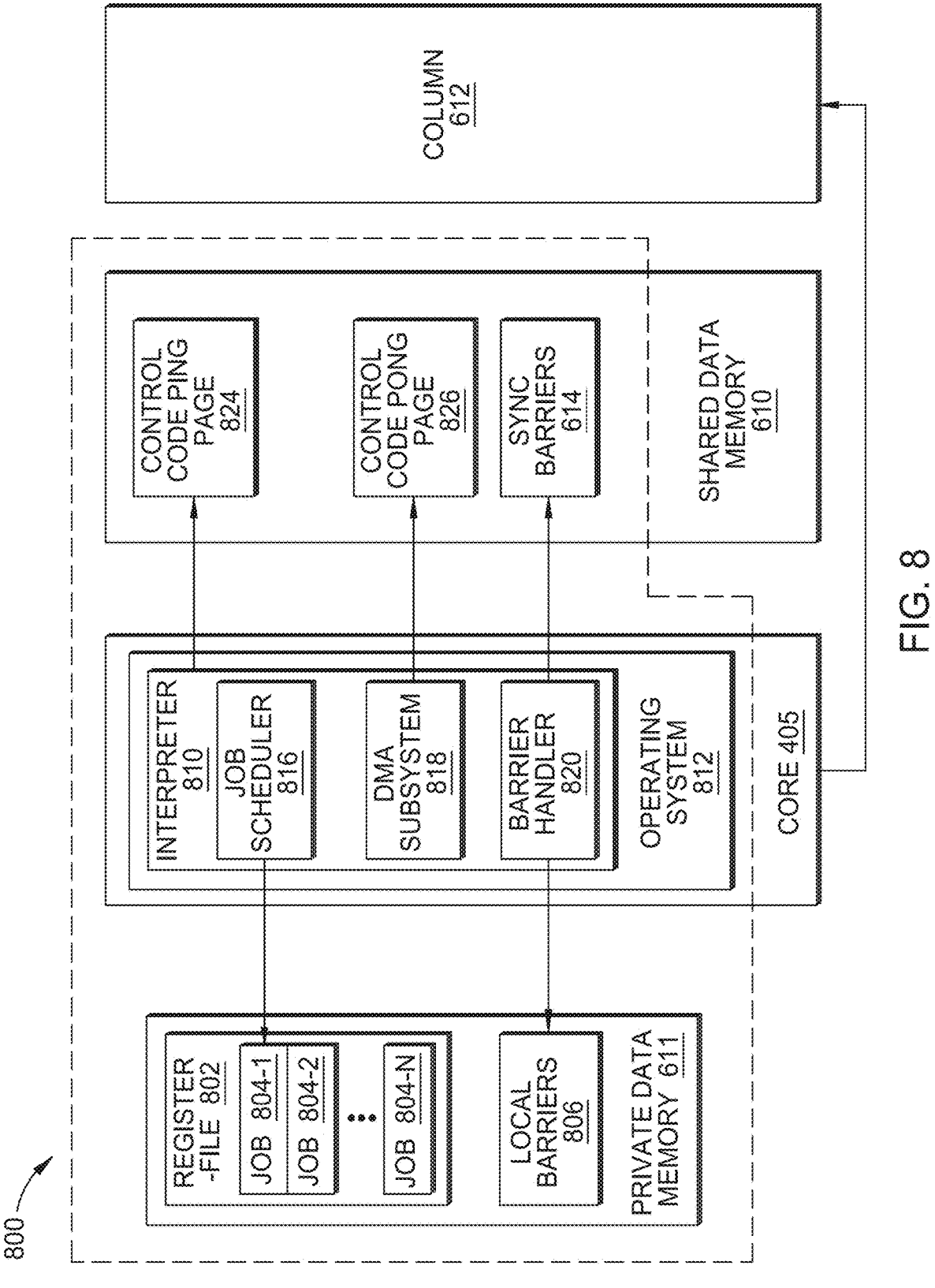
FIG. 8 illustrates an architecture of firmware executed by a controller, according to an example.

FIG. 8 illustrates an architecture 800 of firmware (within dashed line) executed by a controller 127, according to an example. The architecture 800 includes a private data memory 611 such as the DM 415 shown in FIG. 4 and an operating system 812 executing on a core 405 of the controller 127. The private data memory 611 is illustrated to include a register-file 802 and local barriers 806. As shown, the register-file 802 includes jobs 804-1, 804-2, . . . , 804-*n*. In some examples, each of the jobs 804-1, 804-2, . . . , 804-*n* is associated with one or more registers included in the register-file 802. In various embodiments, the jobs 804-1, 804-2, . . . , 804-*n* may be representative of the jobs included in the control code segment 606-1 described with respect to FIG. 6 and/or commands included in the compiled binary described with respect to FIG. 4. The operating system 812 executing on the core 405 of the controller 127 includes an interpreter 810 810 which coordinates execution of the jobs 804-1, 804-2, . . . , 804-*n*. The interpreter 810 includes a job scheduler 816, a DMA subsystem 818, and a barrier handler 820. In some embodiments, the DMA 420 (shown in FIG. 4) includes the job scheduler 816 and the DMA subsystem 818.

In one or more embodiments, the DMA subsystem 818 accesses a shared data memory 610 and pages in a control code ping page 824 that includes one or more of the jobs 804-1, 804-2, . . . , 804-*n*. In certain embodiments, the job scheduler 816 cycles through the jobs 804-1, 804-2, . . . , 804-*n* and selects jobs 804-1, 804-2, . . . , 804-*n* to execute. In some examples, the interpreter 810 accesses the shared data memory 610 to cause execution of instructions included in the control code ping page 824 based on the jobs 804-1, 804-2, . . . , 804-*n* selected by the job scheduler 816.

In various embodiments, the DMA subsystem 818 accesses the shared data memory 610 and pages in (e.g., prefetches) a control code pong page 826 that includes one or more of the jobs 804-1, 804-2, . . . , 804-*n*. In some embodiments, when the last instructions included in the control code ping page 824 are executed, then the interpreter 810 causes execution of instructions included in the control code pong page 826. In one or more embodiments, the DMA subsystem 818 accesses the shared data memory 610 and pages in a new page as the control code ping page 824 for execution after the control code pong page 826.

In one or more embodiments, the barrier handler 820 accesses the local barriers 806 of the private data memory 611 and synchronization barriers 614 of the shared data memory 610, for example, in order to synchronize a column 612 within an array (e.g., one of the columns of the array 105 in FIG. 1). In certain embodiments, the local barriers 806 are for synchronization across the jobs 804-1, 804-2, . . . , 804-*n* and the synchronization barriers 614 are for synchronization across controllers. When multiple jobs 804-1, 804-2, . . . , 804-*n* are to be executed concurrently by the controller 127, the local barriers 806 synchronize execution of the multiple jobs 804-1, 804-2, . . . , 804-*n*. For example, if the multiple jobs include the jobs 804-1 and 804-2, then a local barrier of the local barriers 806 ensures that each of the jobs 804-1, 804-2 reach the local barrier before either of the jobs 804-1, 804-2 pass the local barrier. The local barrier is included at a specific location within the private data memory 611. When both of the jobs 804-1, 804-2 reach the local barrier, then both of the jobs 804-1, 804-2 pass the local barrier and execution of the multiple jobs 804-1, 804-2 is synchronized. The synchronization barriers 616 can include the synchronization barriers 614-1, 614-2, 614-3 for synchronizing jobs executed by the controller 127 and one or more additional controllers as described above with respect to FIG. 6. In some examples, the core 405 executes the operating system 812 of the firmware to interact with the column 612 (e.g., by programming buffer descriptors, pausing for locks, etc.).

Figure 9:
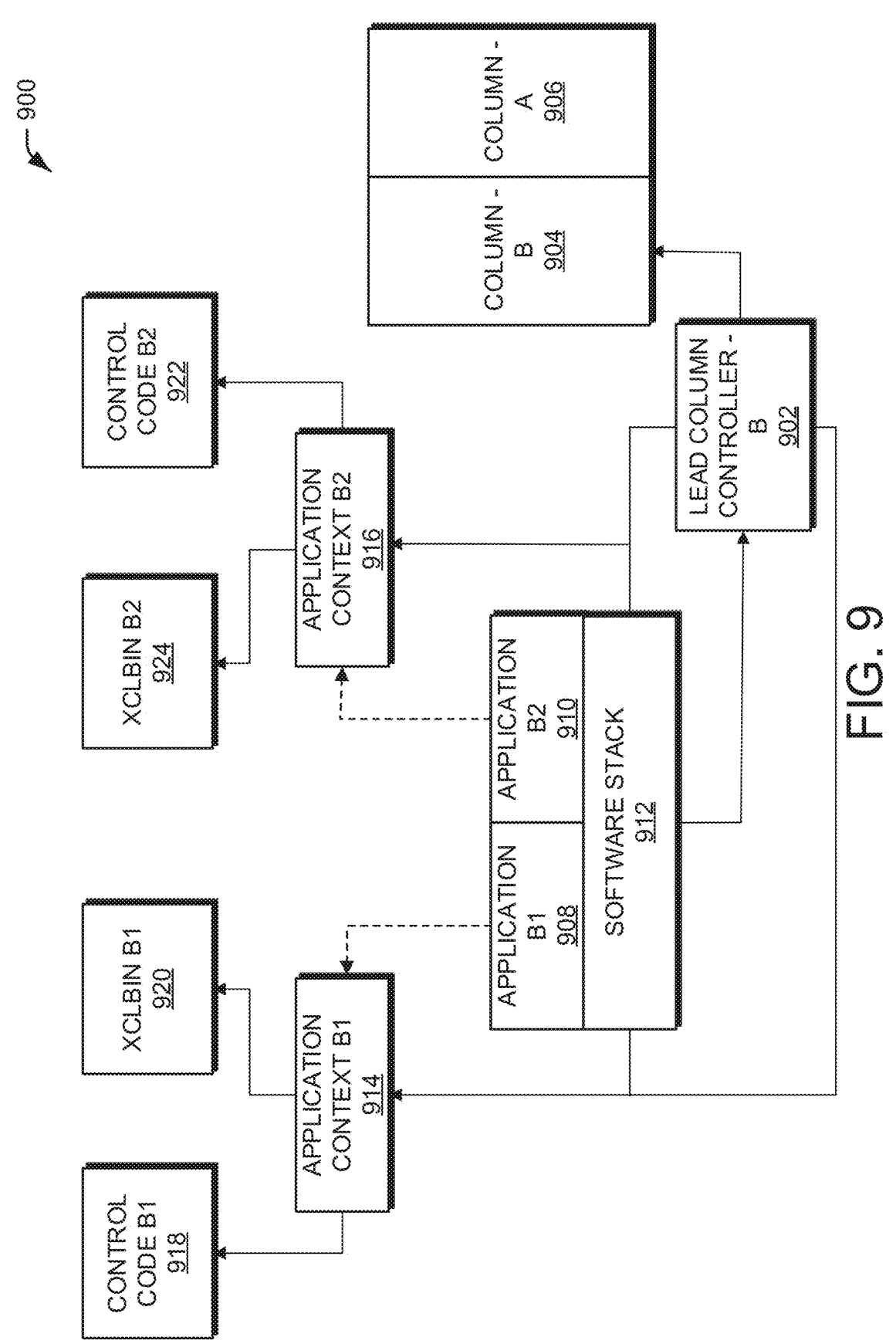
FIG. 9 illustrates an example of a lead column processor and an artificial intelligence engine (AIE) partition.

FIG. 9 illustrates a system 900 that includes a lead column controller and a DPE partition. The system 900 includes a lead column controller—B 902, a column-B 904, and a column—A 906, which may be columns of the array 105 in FIG. 1. For example, the lead column controller—B 902 may represent the controller 127-1. In one or more embodiments, the lead column controller—B 902 is capable of switching between executing application B1 908 and executing application B2 910 via a software stack 912.

In some examples, the application B1 908 is associated with application context B1 914 and the application B2 910 is associated with application context B2 916. In order to initially execute the application B1 908, the lead column controller—B 902 implements the application context B1 914 to load control code B1 918 (e.g., the DMA subsystem 818 writes instructions included in the control code B1 918 to the shared data memory 610) and to load xclbin B1 920 (e.g., write the xclbin B1 920 binary to memory of a compute tile). For example, after loading the control code B1 918 and the xclbin B1 920, the lead column controller—B 902 executes the application B1 908 by executing jobs included in the control code B1 918 via the column—B 904.

After executing the application B1 908 for a first period of time, the lead column controller—B 902 may switch to executing the application B2 910 by implementing the application context B2 916 to load control code B2 922 (e.g., the DMA subsystem 818 writes instructions included in the control code B2 922 to the shared data memory 610) and to load xclbin B2 924 (e.g., write the xclbin B2 924 binary to memory of a compute tile). In some examples, after loading the control code B2 922 and the xclbin B2 924, the lead column controller—B 902 executes the application B2 910 by executing jobs included in the control code B2 922 via the column—B 904. In various embodiments, after executing the application B2 910 for a second period of time, the lead column controller—B 902 can switch back to executing the application B1 908 by implementing the application context B1 914 to load the control code B1 918 and the xclbin B1 920.

Figure 10:
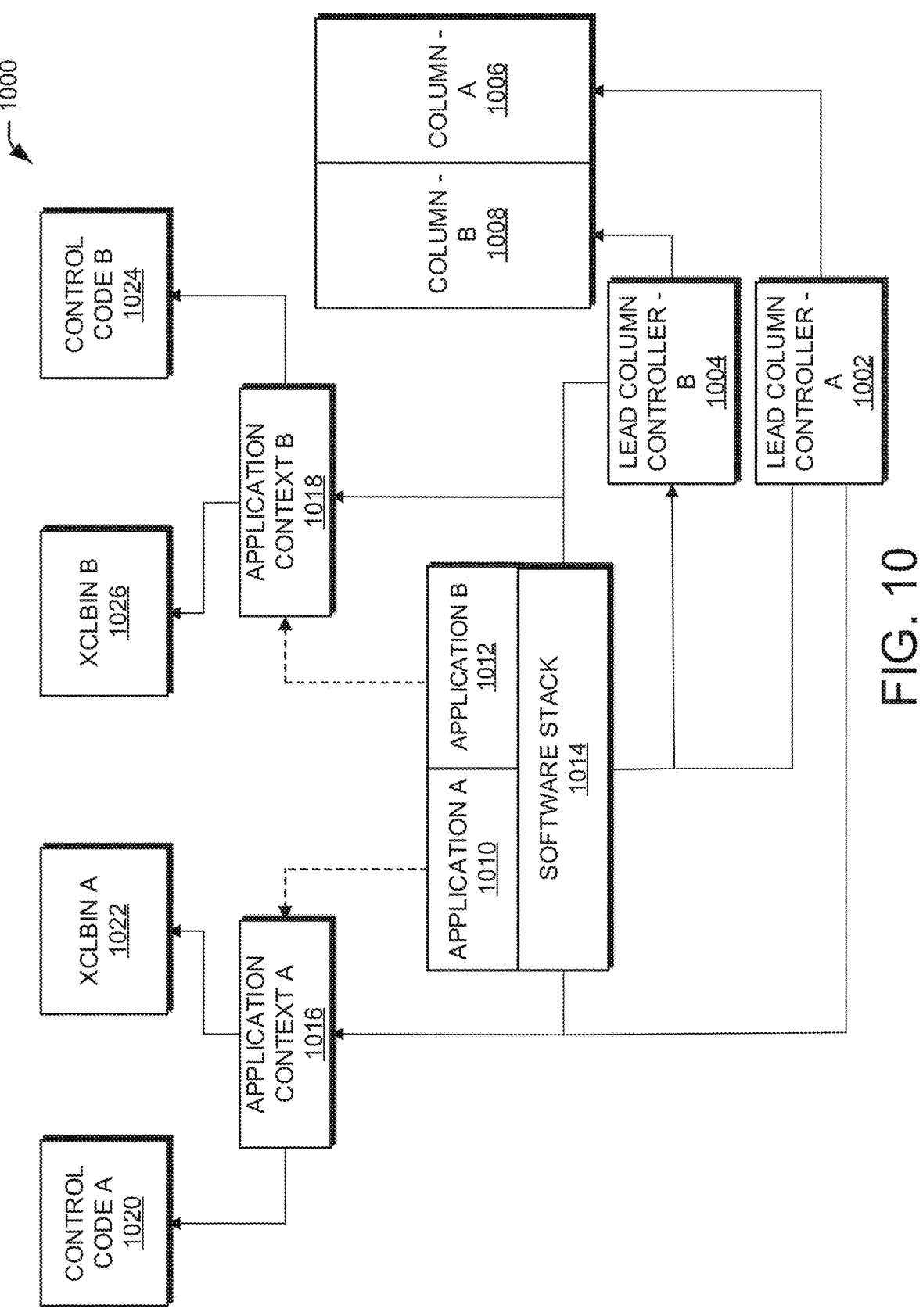
FIG. 10 illustrates an example of lead column processors and an artificial intelligence engine (AIE) array.

FIG. 10 illustrates a system 1000 that includes lead column controllers and an artificial intelligence engine (AIE) array. The system 1000 includes a lead column controller—A 1002, a lead column controller—B 1004, a column—A 1006, and a column—B 1008, which may be columns of the array 105 in FIG. 1. In some examples, the lead column controller—A 1002 and the lead column controller—B 1004 are capable of simultaneously executing application A 1010 and application B 1012 via a software stack 1014. In various embodiments, the lead column controller—A 1002 represents a first instance of the controller 127-1 and the lead column controller—B 1004 represents a second instance of the controller 107-1.

As shown in the system 1000, the application A 1010 is associated with application context A 1016 and the application B 1012 is associated with application context B 1018. For example, the lead column controller—A 1002 implements the application context A 1016 to load control code A 1020 (e.g., the DMA subsystem 818 of the lead column controller—A 1002 writes instructions included in the control code A 1020 to the shared data memory 610 of the lead column controller—A 1002) and to load xclbin A 1022 (e.g., write the xclbin A 1022 binary to memory of a compute tile). In one or more embodiments, after loading the control code A 1020 and the xclbin A 1022, the lead column controller—A 1002 executes the application A 1010 by executing jobs included in the control code A 1020 via the column—A 1006.

Similarly, in various embodiments, the lead column controller B 1004 implements the application context B 1018 to load control code B 1024 (e.g., the DMA subsystem 818 of the lead column controller—B 1004 writes instructions included in the control code B 1024 to the shared data memory 610 of the lead column controller—B 1004) and to load xclbin B 1026 (e.g., write the xclbin B 1026 binary to memory of a compute tile). In some embodiments, after loading the control code B 1024 and the xclbin B 1026, the lead column controller—B 1004 executes the application B 1012 by executing jobs included in the control code B 1024 via the column—B 1008. Accordingly, the application A 1010 and the application B 1012 can be simultaneously executed via the column—A 1006 and the column—B 1008, respectively.

FIG. 11 is a flow diagram depicting a method 1100 for executing workloads across an array of controllers, according to an example. At operation 1102, a user defined application is received. In one or more embodiments, the user defined application 602 is received in a memory. At operation 1104, control code is compiled based on one or more instructions included in the user defined application. In some embodiments, the control code segments 606-1, 606-2, 606-3 are compiled based on the one or more instructions included in the user defined application 602.

At operation 1106, a first segment of the control code is executed by a first controller. In various embodiments, the control code segment 606-1 is executed by the processor 608-1. At operation 1108, a second segment of the control code is executed by a second controller. In one or more embodiments, the control code segment 606-2 is executed by the processor 608-2. In various embodiments, the control code segments 606-1, 606-2 are executed simultaneously.

At operation 1110, a notification is received that the first segment and the second segment have been executed. In some embodiments, the shared memory 610-1 receives the indication that the control code segment 606-2 has been executed. At operation 1112, a synchronization barrier is passed based on the notification. In certain embodiments, the processor 608-1 passes the synchronization barrier 614-1 based on the indications received in the shared data memory 610-1.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

While the foregoing is directed to specific examples, other and further examples may be devised without departing from the basic scope thereof, and the scope thereof is determined by the claims that follow.

What is claimed is:

1. A hardware accelerator array comprising:
   a plurality of data processing engine (DPE) tiles arranged in a plurality of columns; and
   a plurality of interface tiles, wherein each of the plurality of columns includes at least one of the plurality of interface tiles, wherein each of the plurality of interface tiles comprises a respective controller configured to control execution of multiple DPE tiles in a respective column of the plurality of columns, wherein each of the controllers comprises:
      direct memory access (DMA) circuitry configured to fetch commands, wherein the commands define a task to be performed by the plurality of DPE tiles; and
      first circuitry configured to convert the commands into instructions for controlling the execution of the multiple DPE tiles in the respective column.

2. The hardware accelerator array of claim 1, wherein the plurality of interface tiles is coupled to a network on chip (NoC) to facilitate data communication into, and out of, the hardware accelerator array.

3. The hardware accelerator array of claim 1, wherein the DMA circuitry is configured to fetch the commands from a binary generated by a compiler wherein each of the controllers comprises a core comprising the first circuitry that is configured to execute a program that converts the commands into the instructions for controlling the execution of the multiple DPE tiles in the respective column.

4. The hardware accelerator array of claim 3, wherein the instructions perform DMA operations using DMA circuitry in at least one of a respective interface tile or the multiple DPE tiles in the respective column.

5. The hardware accelerator array of claim 3, wherein each of the plurality of interface tiles comprises DMA circuitry configured to perform DMA operations based on the instructions.

6. The hardware accelerator array of claim 3, wherein each of the plurality of interface tiles comprises a memory mapped (MM) switch that is used by the respective controller to transmit the instructions to other tiles in the respective column.

7. The hardware accelerator array of claim 3, wherein the core is configured to receive a completion signal from a tile when the instructions are completed, and convert additional commands from the binary into additional instructions for the tile.

8. The hardware accelerator array of claim 3, wherein the binary is compiled based on a machine learning (ML) model, wherein the commands comprise ML functions that are converted into DMA operations that enable the plurality of DPE tiles to perform the ML functions.

9. The hardware accelerator array of claim 1, further comprising:

a plurality of memory tiles arranged in the plurality of columns and configured to store data processed by the plurality of DPE tiles, wherein the plurality of memory tiles comprises DMA circuitry, but do not have cores.

10. The hardware accelerator array of claim 9, wherein the plurality of memory tiles are disposed between the plurality of interface tiles and the plurality of DPE tiles.

11. A hardware accelerator array comprising:

a plurality of data processing engine (DPE) tiles arranged in a plurality of columns; and a plurality of controllers arranged in the plurality of columns, the plurality of controllers configured to control execution of only DPE tiles in a same column, wherein each of the plurality of controllers comprises:

direct memory access (DMA) circuitry configured to fetch commands, wherein the commands define a task to be performed by the plurality of DPE tiles; and a core comprising circuitry configured to convert the commands into instructions for controlling the execution of the DPE tiles in a respective column.

12. A method for controlling a plurality of data processing engine (DPE) tiles arranged in a plurality of columns in a hardware accelerator array, the method comprising:

fetching, using a plurality of controllers, commands from a binary, wherein the plurality of controllers are disposed within the plurality of columns;

converting, using the plurality of controllers, the commands into DMA and control instructions;

transmitting the DMA and control instructions from the plurality of controllers to DMA circuitry in the hardware accelerator array to move data into the plurality of DPE tiles for processing;

receiving, at the plurality of controllers, a completion signal from a tile in the hardware accelerator array when one of the DMA and control instructions is complete; and converting, at the plurality of controllers, additional commands from the binary into additional instructions for the tile.

13. The method of claim 12, wherein the plurality of controllers is disposed within a plurality of interface tiles arranged in the plurality of columns.

14. The method of claim 13, wherein the plurality of interface tiles is coupled to a NoC to facilitate data communication into, and out of, the hardware accelerator array.

15. The method of claim 13, wherein the DMA and control instructions are transmitted to DMA circuitry in the plurality of interface tiles or the plurality of DPE tiles.

16. The method of claim 12, wherein the completion signal is received on a streaming network in the hardware accelerator array and the DMA and control instructions are transmitted using a MM network in the hardware accelerator array.

17. The method of claim 13, wherein the binary is compiled based on a ML model, wherein the commands comprise ML functions that are converted into the DMA and control instructions that enable the plurality of DPE tiles to perform the ML functions.

18. The method of claim 13, wherein the hardware accelerator array further comprises:

a plurality of memory tiles arranged in the plurality of columns and configured to store data processed by the plurality of DPE tiles, wherein the plurality of memory tiles comprises DMA circuitry, but do not have cores.

19. The method of claim 18, wherein the plurality of memory tiles are disposed between the plurality of controllers and the plurality of DPE tiles in the hardware accelerator array.

* * * * *